United States Patent
Fox et al.

(10) Patent No.: US 11,597,637 B2
(45) Date of Patent: Mar. 7, 2023

(54) UNDER HOIST SUPPORT STAND

(71) Applicant: VIS, LLC, Travelers Rest, SC (US)

(72) Inventors: Robert Fox, Greenville, SC (US); Nathan Harvell, Greenville, SC (US)

(73) Assignee: VIS, LLC

( * ) Notice: Subject to any disclaimer, the term of this patent is extended or adjusted under 35 U.S.C. 154(b) by 0 days.

(21) Appl. No.: 16/278,312

(22) Filed: Feb. 18, 2019

(65) Prior Publication Data
US 2019/0256332 A1    Aug. 22, 2019

Related U.S. Application Data

(60) Provisional application No. 62/633,649, filed on Feb. 22, 2018.

(51) Int. Cl.
*B66F 3/08*    (2006.01)
*B60S 9/08*    (2006.01)

(52) U.S. Cl.
CPC ..... *B66F 3/08* (2013.01); *B60S 9/08* (2013.01); *B66F 2700/04* (2013.01)

(58) Field of Classification Search
CPC ...... B66F 3/08; B66F 3/16; B66F 3/18; B66F 3/20; B66F 5/00; B66F 5/02; B66F 1/00; B66F 1/06; B66F 2700/04; F16M 11/28; B60S 9/08; B23B 31/1078; B23B 31/1079; B23B 31/16279; Y10T 29/53848; Y10T 29/53852; Y10T 29/53857; Y10T 29/53861; Y10T 29/53865; Y10T 29/5387; Y10T 29/53874; Y10T 29/53878; Y10T 29/53883; Y10T 29/53887; Y10T 29/53891

USPC ............... 254/98, 100, 103, 133 R
See application file for complete search history.

(56) References Cited

U.S. PATENT DOCUMENTS

| | | | | |
|---|---|---|---|---|
| 209,344 A | * | 10/1878 | J. O. ............ | B66F 3/08 254/98 |
| 295,837 A | * | 3/1884 | A. R. ............ | B66F 3/08 254/98 |
| 1,513,334 A | * | 10/1924 | Maino .......... | B66F 3/08 254/103 |
| 2,310,942 A | * | 2/1943 | Donges ........ | B66F 3/20 254/425 |
| 2,316,432 A | * | 4/1943 | Hott ............. | B66F 3/08 254/98 |
| 2,503,659 A | | 4/1950 | Curtis | |
| 2,548,903 A | | 4/1951 | Mueller | |

(Continued)

FOREIGN PATENT DOCUMENTS

| CN | 1703540 A | 11/2005 |
|---|---|---|
| CN | 206972657 U | 2/2018 |

(Continued)

OTHER PUBLICATIONS

Machine Translation of EP0527110 (Year: 1993).*

(Continued)

*Primary Examiner* — Lee D Wilson
*Assistant Examiner* — Alberto Saenz
(74) *Attorney, Agent, or Firm* — Thrive IP

(57) ABSTRACT

An under hoist support stand in which the spin handle to turn the threaded support screw can be selectively engaged and disengaged from the support screw and allows the screw to be positioned along a longitudinal axis of the support stand.

8 Claims, 5 Drawing Sheets

(56) References Cited

U.S. PATENT DOCUMENTS

| | | | |
|---|---|---|---|
| 4,966,345 A | 10/1990 | Nanicoba | |
| 6,708,966 B1 | 3/2004 | Troudt | |
| 8,025,279 B2 | 9/2011 | Seber | |
| 9,022,375 B2 | 5/2015 | Allred | |

FOREIGN PATENT DOCUMENTS

| | | | | |
|---|---|---|---|---|
| CN | 207526805 U | 6/2018 | | |
| EP | 0522230 | 1/1993 | | |
| EP | 0527110 A1 * | 2/1993 | ............. | E04G 25/04 |
| FR | 1149059 | 12/1957 | | |

OTHER PUBLICATIONS

Intellectual Propery Office Search Report Under Section 17(5); 4 Pages.
Translation of Office Action with original text included; Office Action dated Jan. 12, 2022 in related international application, Chinese Application No. 3034364; 17 pages.
Translation of Foreign Reference CN 207526805 (Cite No. 1) including Description and Claims; published Jun. 22, 2018; 5 pages.
Translation of Foreign Reference CN 1703540 (Cite No. 2) including Description and Claims; published Nov. 30, 2005; 8 pages.
Translation of Foreign Reference CN 206972657 (Cite No. 3) including Description and Claims; published Feb. 6, 2018; 5 pages.

\* cited by examiner

UNDER HOIST SUPPORT STAND

RELATED APPLICATIONS

This application claims the benefit of U.S. Application Ser. No. 62/633,649 filed on Feb. 22, 2018 and which is incorporated herein by reference.

FIELD OF THE INVENTION

This invention is directed towards an under hoist support stand used for repair and servicing of automotive vehicle components. This invention is more particularly directed an under hoist support stand which allows for a rapid adjustment of the saddle to the required work height. The saddle may be quickly placed and positioned with an under vehicle part followed by a subsequent tightening/tensioned securement using a threaded actuator.

BACKGROUND OF THE INVENTION

This invention relates to under hoist support stands that are used to support portions of a vehicle to allow for the repair, installation, or disassembly of a component that is accessed from beneath a vehicle.

One typical prior art design for an under hoist stand includes a spin handle on a support screw which further supports the under hoist support saddle. To extend the screw, the spin handle is manually turned in a clockwise direction which will extend the support screw until the saddle touches the under vehicle part. Additional turning/tightening of the spin handle will firmly engage the saddle up against the under vehicle component and providing support. Since the retracted height of the under hoist stand is less than a typical vehicle working height of 72 inches, continuous turning of the spin handle is necessary to extend the support screw. The continuous spinning for engaging and disengaging the saddle is a time consuming process. Accordingly, there is room for improvement and variation within the art.

SUMMARY OF THE INVENTION

It is one aspect of at least one of the present embodiments of the invention to provide for an under hoist support stand in which the spin handle to turn the threaded support screw can be selectively engaged and disengaged from the support screw and allows the screw to be positioned along a longitudinal axis of the support stand.

It is a further aspect of at least one of the present embodiments to provide for an under hoist support, stand in which the support screw can be raised and lowered through a spin handle assembly which reversibly engages and disengages the support screw.

It is a further aspect of at least one embodiment of the present invention to provide for a spin handle assembly having a pair of pivoting release tabs which collectively provide for a pair of opposing threaded surfaces designed to selectively engage and release an accompanying support screw, thereby allowing rapid positioning of the support screw and accompanying saddle relative to a vehicle component.

It is a further aspect of at least one embodiment of the present invention to provide for a under hoist support stand having a base; a support tube extending from the base; a screw partially housed within the support tube and having a free end in communication with a saddle; a spin handle assembly in threaded communication with the screw, the spin handle assembly being used to raise and lower the screw relative to the support tube, the spin handle assembly further comprising a release mechanism for disengaging the spin handle assembly from threaded engagement with the screw, thereby allowing the screw to be manually raised and lowered through the spin handle assembly when disengaged.

It is a further aspect of at least one embodiment of the present invention to provide, for a process of adjusting the working height of the saddle of an under hoist stand comprising steps of: providing an under hoist stand comprising a screw member in communication with a saddle positioned on a terminal end of the screw member; providing a spin handle assembly in threaded communication with the screw member, the spin handle assembly allowing movement of the screw when threadily engaged by the spin handle assembly, the spin handle assembly further having a release member that selectively disengages the spin handle assembly from threaded engagement with the screw, thereby allowing the screw to be manually raised or lowered when disengaged from threaded engagement with the spin handle assembly; disengaging the screw from the spin handle assembly; raising the screw and the saddle to a support location beneath a vehicle; reengaging the screw with the spin handle assembly; rotating the spin handle assembly to further engage the saddle to a supported work piece.

It is a further aspect of at least one embodiment of the present invention to provide for an apparatus and a process that allows for the lowering of a saddle of a under hoist support stand comprising the steps of disengaging the threads of a screw from the mated threaded engagement within a spin handle assembly; manually lowering the screw relative to the support base when the spin handle assembly is disengaged from the screw; reengaging the threads of the screw by the spin, handle assembly.

It is a further aspect of at least one embodiment of the present invention to provide for a spin handle assembly for selectively engaging and disengaging from a threaded screw comprising: a housing, the housing defining an axial bore there through; a pair of opposing openings defined within the outer walls of the housing; a first release member pivotally attached within one of the pair of opposing openings; a second release member pivotally attached within of the pair of opposing openings, said first release member and said second release member being in communication with a respective spring which moves the respective release members to a first position within the housing, said first and said second release members each defining a threaded surface adapted for engaging and securing with a threaded screw inserted in the axial bore; wherein when the spin handle assembly has a threaded screw inserted within the axial bore, the respective threaded surfaces of the first release member and the second release member will engage the threaded screw surfaces via pressure supplied by the respective springs, the first and second release members further allowing for a pivoted disengagement of the first and second threaded surfaces from the threaded screw, thereby allowing the free movement of the threaded screw relative to the spin handle assembly.

It is a further aspect of at least one embodiment of the present invention to provide for the spin handle assembly wherein the spin handle assembly further defines at least one handle extending from an exterior surface of the housing.

These and other features, aspects, and advantages of the present invention will become better understood with reference to the following description and appended claims.

BRIEF DESCRIPTION OF THE DRAWINGS

A fully enabling disclosure of the present, invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as pail of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 4:
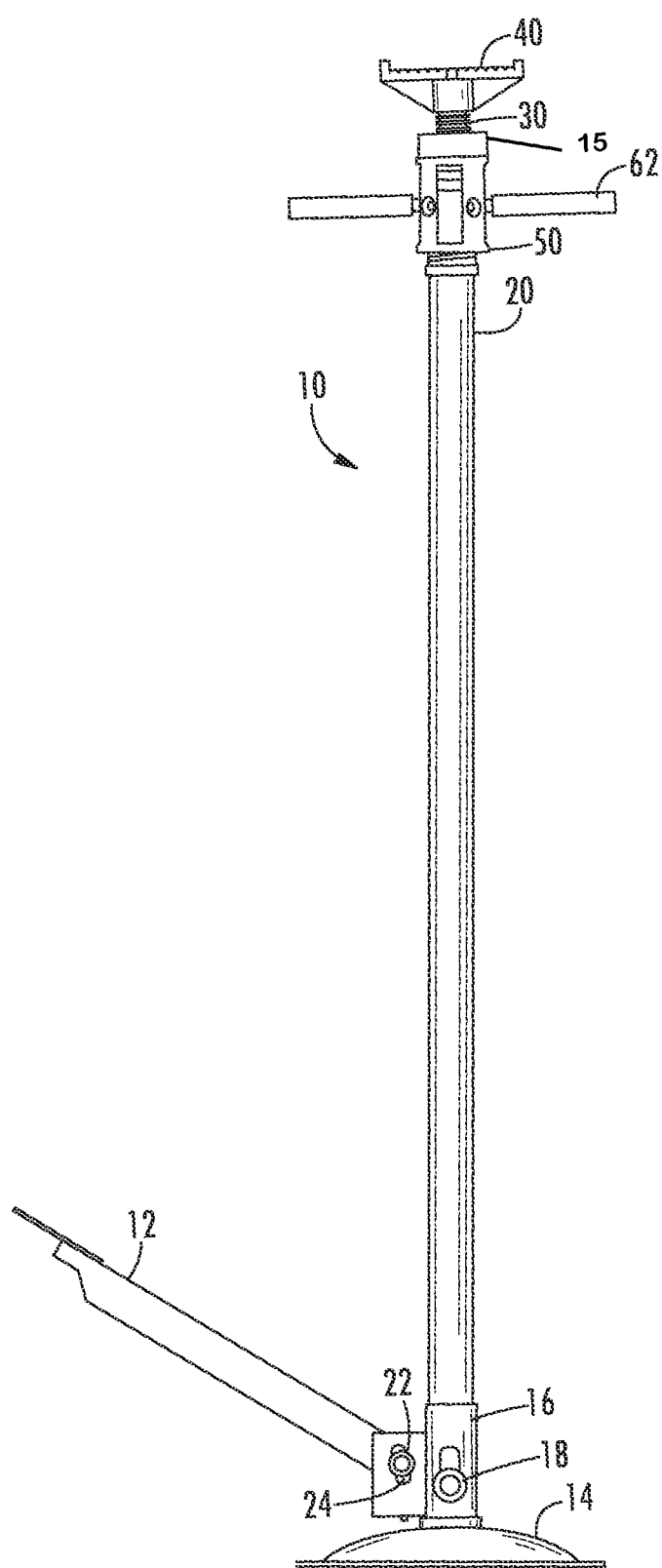
FIG. 4 is a side view of a under hoist stand showing relative position of the component parts.

As best seen in FIG. 4, a under hoist stand 10 is provided having a stand 10 and comprises a support tube 20 which is attached to a support base 14 and second within a base receiver 16. In the configuration as illustrated, a locking pin 18 can be used to secure the support tube 20 to the base receiver 16. However, there are a number of conventional designs, such as threaded engagement of a tube to a base that could also be employed.

As further seen in reference to FIG. 4, a pedal 12 can be attached to the base receiver 16 by a pin 22 which is housed within a slot 24. This arrangement allows this pedal to be depressed and for a slight pivoting action of lifting the support tube in an upward direction along a vertical distance of about 1 to 2 inches.

Figure 1:
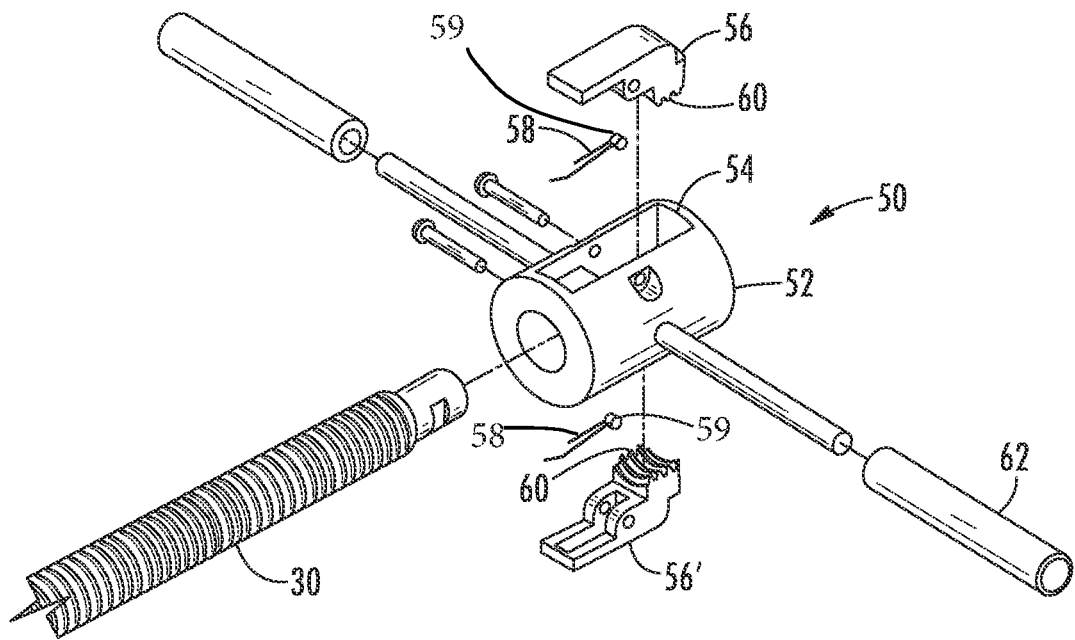
FIG. 1 is an exploded perspective view of a spin handle assembly seen in accordance with one embodiment of the present invention.

A screw 30 is partially contained within the support tube 20 and has a free end that extends above the support tube and supports an under hoist saddle 40. Along the top of support tube 20, a spin handle assembly 50 is provided as best seen in reference to FIG. 1. The handle assembly 50 comprises a cylindrical housing 52 which defines a pair of notches 54 deferred by opposite sides of the housing 52. The notches 54 allow for the securement of tab members 56 and 56' to be partially retained within the housing and are responsive to respective spring elements 58 secured to pivot 59. The spring elements 58 and tabs 56 and 56' allow for the selective engagement and disengagement of a threaded section 60, associated with a portion of each tab member 56 and 56', from the screw 30. The threads 60 are designed to engage with the external threads of the screw 30 such that when the spin handle assembly 50 is rotated, using handles 62, the screw 30 can be actuated in either an upward or downward axial direction through the spin handle assembly 50.

Preferably, the percentage of the threads of screw 30 which are engaged by the opposing thread portion 60 of tabs 56 and 56' is up to about 70% of the adjacent surfaces of the screw 30 portion. A range of between about 40% to about 70% and more preferably between about 50% to about 70% of engagement between the threaded portion 60 of tabs 56 and 56' and the opposite portion of the threads of screw 30 has been found useful in maintaining a secure engagement between the tabs 50 and 56' and thread screws 30 so as to maintain the handle in a desired and fixed position relative to the threaded screw 30.

When the tabs 56 and 56' are actuated upon pivot 59 by a user, the threaded portion 60 will pivot away from the threads of screw 30 and allow the screw 30 to be manually moved through the handle assembly 50 without engaging the threads 60. In this manner, the screw can be extended from the support tube 20 in a rapid fashion thereby placing the saddle 40 in a desired location beneath a vehicle such that a work piece of the vehicle can be supported by the saddle 40. Upon engagement of the saddle 40 with the work piece, the tabs 56 and 56' can be released and the springs 58 will return the threaded portion 60 of tabs 56 and 56' to an engagement position with the external threads of screw 30. Following reengagement of the thread 60 with the screw 30, the user can manually rotate the handle assembly 50 so as to more firmly engage the saddle against a work piece.

This arrangement of parts relative to the threaded screw allows for the screw to be rapidly raised and lowered without having to rotate the handle. The handle rotation, when engaged with the screw, can be used to make fine adjustments in terms of the amount of pressure and tension that is provided to a work piece by the saddle.

A similar operation can be used to rapidly disengage the saddle from the work piece. Upon engagement of the tabs 56 and 56' the thread 60 will disengage from the screw 30 and allow a user to manually retract the screw 30 into the interior of support tube 20. Upon release of the tabs 56 and 56', the thread 60 of the spin handle assembly 50 will reengage the screw 30.

Figure 2:
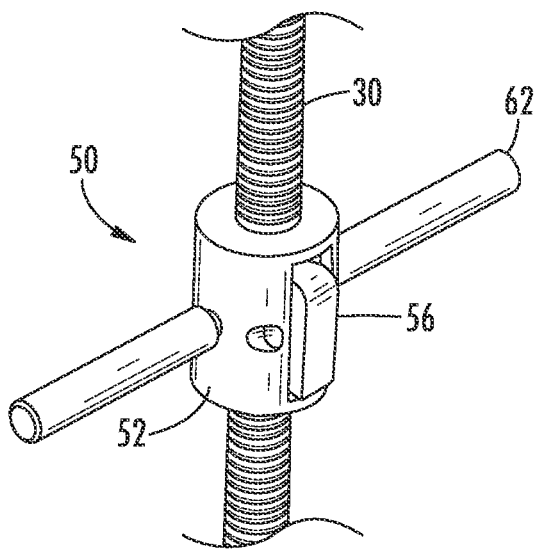
FIG. 2 is a perspective view of the spin handle assembly on the screw.
Figure 3:
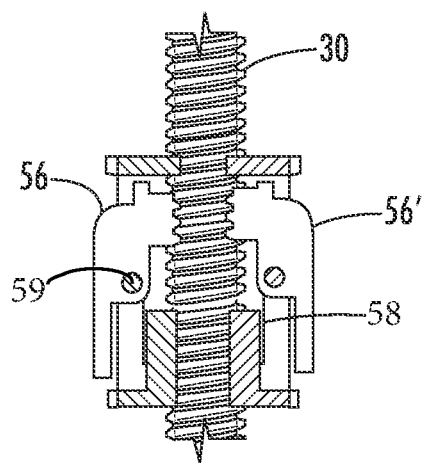
FIG. 3 is a sectional view along a length of the support screw showing internal details of the release tab components within the spin handle.

Additional details of the handle assembly can be seen in reference to FIG. 2 and FIG. 3 of the drawings.

Figure 6:
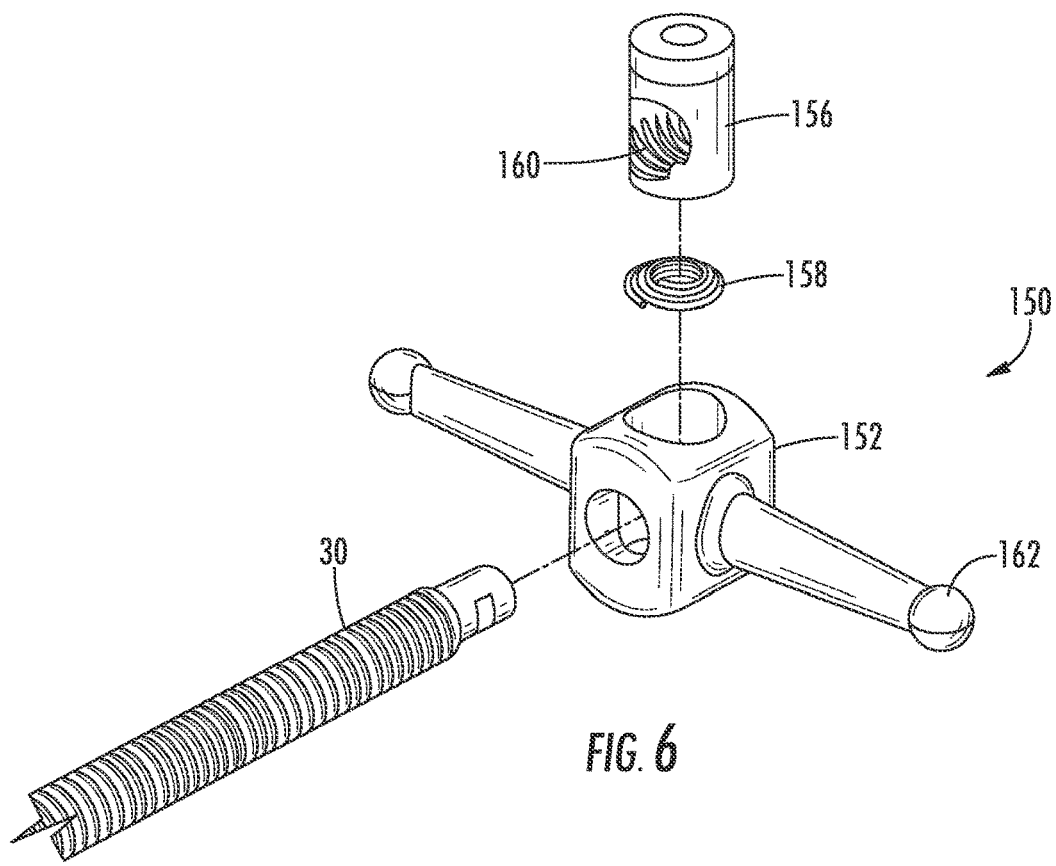
FIGS. 6-8 are directed to an alternative embodiment of a spin handle assembly using a push button spring release mechanism.
Figure 7:
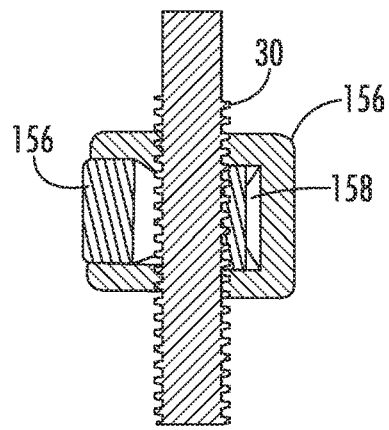
Figure 8:
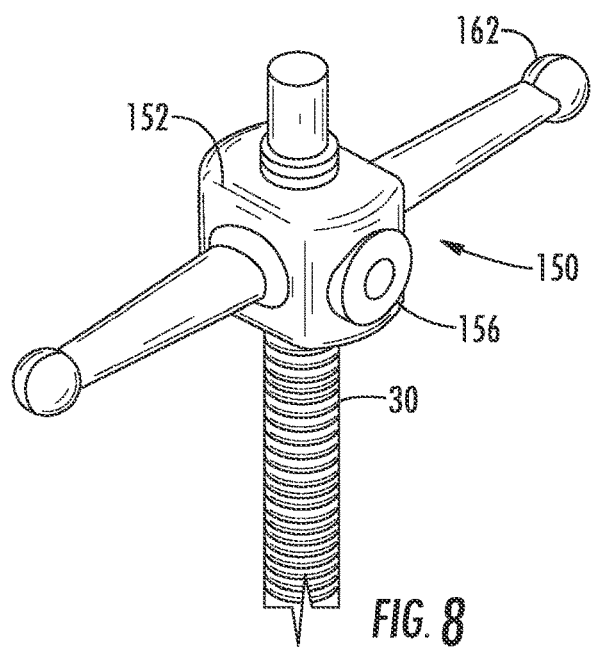

As set forth in FIGS. 6-8, an alternative embodiment of a handle assembly is seen in which, a spin handle assembly 150 comprises a housing 152 in which an interior of the housing is adapted for engagement and receiving a screw 30. A spring 158 is used to provide for a push button operation of an actuator in the form of a push button 156, the push button 156 defining an aperture having a portion of an interior aperture with threads 160 for engaging an exterior threaded surface of screw 30. When the push button 156 is depressed by a user, the threads 160 will disengage from screw 30 and allow for the free passage of the threaded rod through the interior of the spin handle assembly 150. Upon release, the spring 158 will serve to reengage the threaded portion 160 of the push button 156 thereby resecuring the spin handle assembly through to the screw 30.

Figure 10:
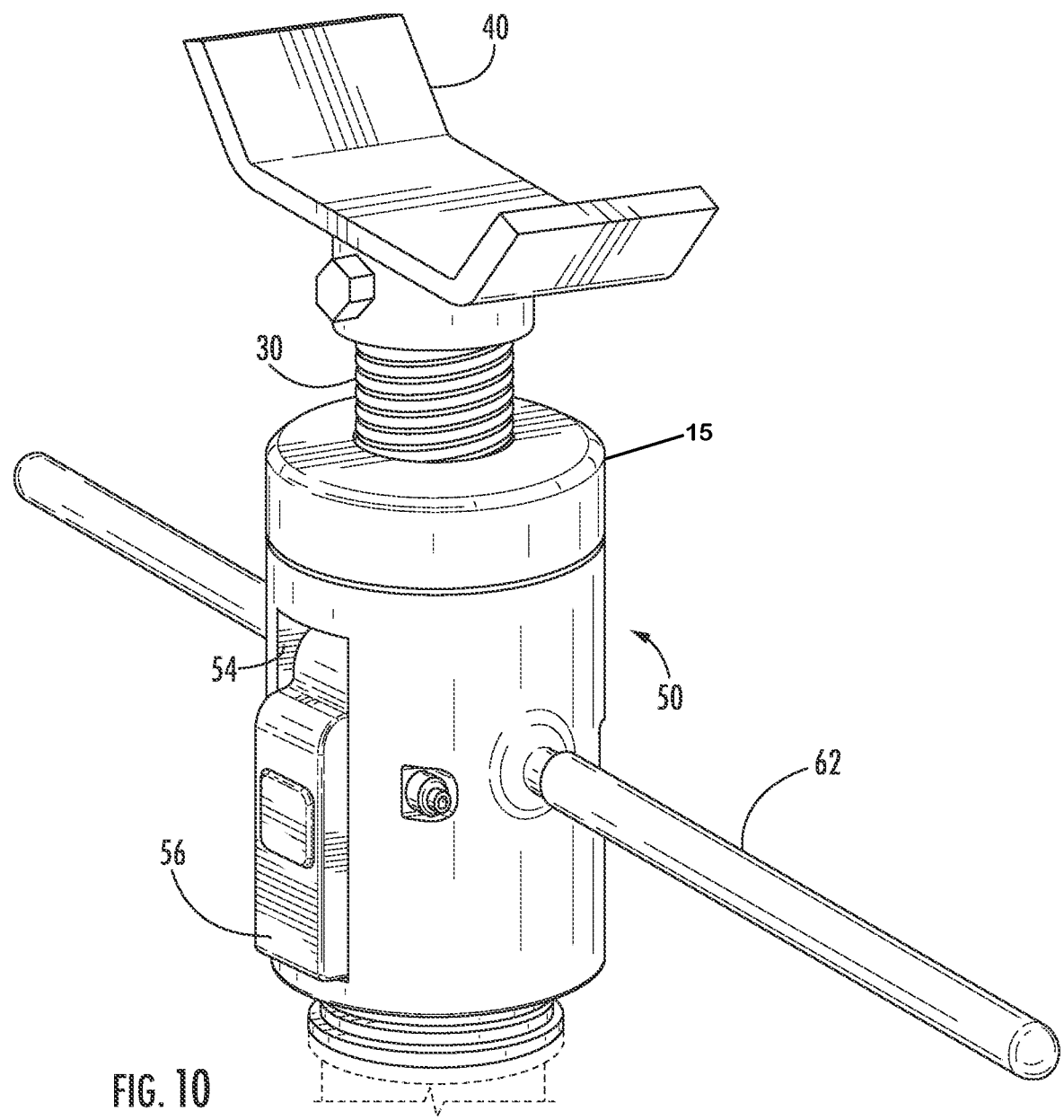
FIG. 10 is a perspective view of an alternate embodiment of the spin handle assembly.

As seen in FIG. 10, a third alternate embodiment of a spin handle assembly 10 is provided in a perspective view.

Figure 9:
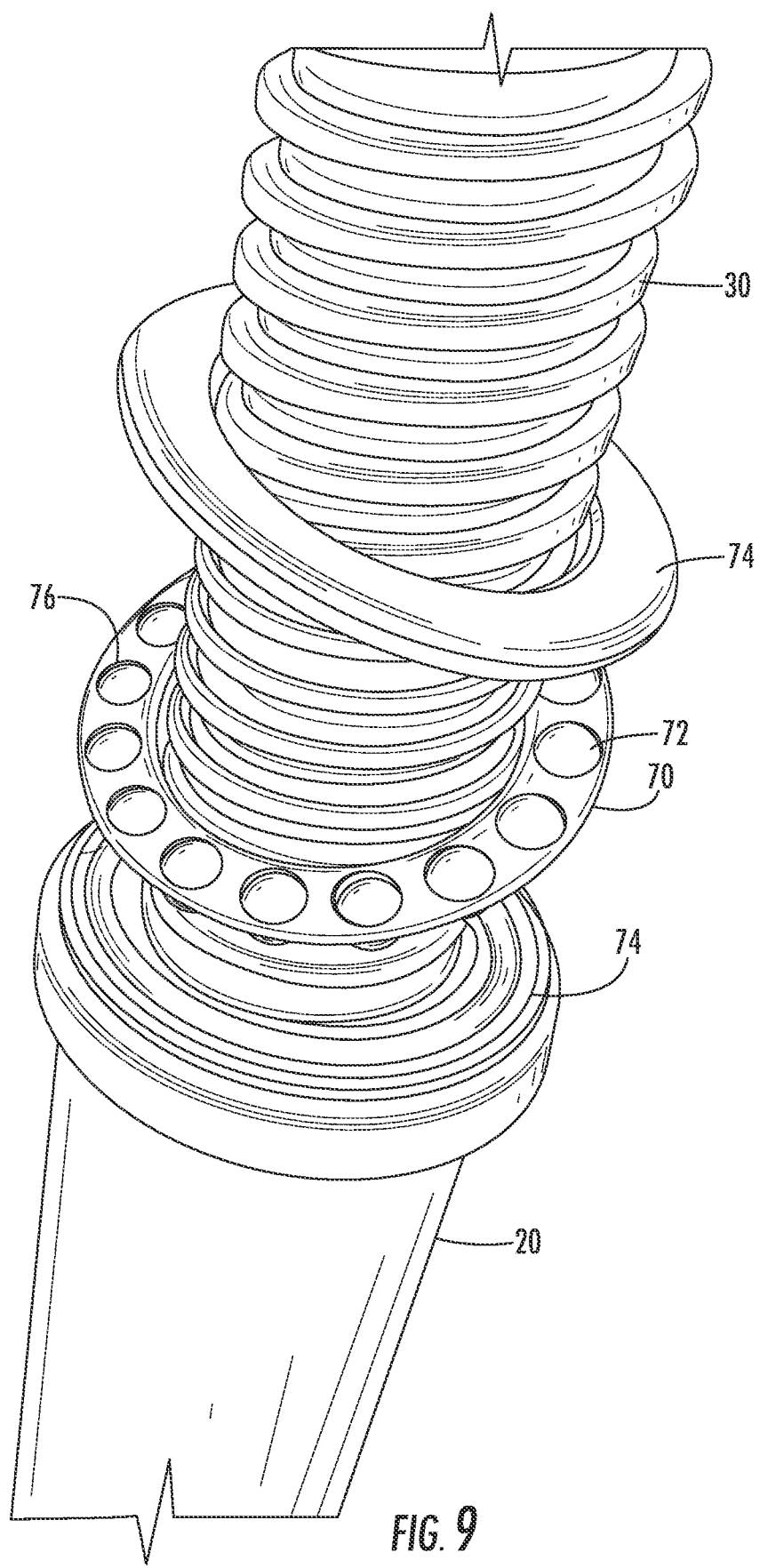
FIG. 9 is a perspective view of a portion of the under hoist stand, showing details of a supporting thrust bearing relative to a threaded screw.

In the several embodiments described herein, the weight of the screw 30 will maintain the spin handle assembly 50 such that at a lower surface handle of the spin handle assembly 50 is in engagement with an upper edge surface of support tube 20. As seen in reference to FIG. 9, a circular thrust bearing 70 is provided which defines a plurality of bearings 72 positioned within the race surfaces. The bearings are between the upper and lower race surfaces and are within respective apertures 76. Thrust bearing 70 defines a circular opening that the screw 30 extends there through. The thrust bearing 70 is further positioned between the two respective washers 74. The lower most washer 74 is engaged by an upper edge of the support tube 20 while the upper washer 74 will engage a lower surface of the spin handle assembly 50. The thrust bearing 70 allows for the smoother and easier rotation of the spin handle assembly 50 when the weight a support load is born by the spin handle assembly.

The present invention greatly improves the time management and, efficiency of using an under hoist support stand. Heretofore, it was a time consuming operation to use a threaded actuator mechanism to physically raise and lower the screw of a under hoist stand 10 a distance of between 20-30 inches. The present invention allows for the selective disengagement of the screw from the threaded spin handle and actuator, allowing the screw to be rapidly positioned at a desired height. Upon reengagement of the spin handle and actuator to the screw 30, the spin handle can be used to make fine adjustments to the amount of pressure and/or height of the saddle 40 relative to a supported work piece.

Figure 5:
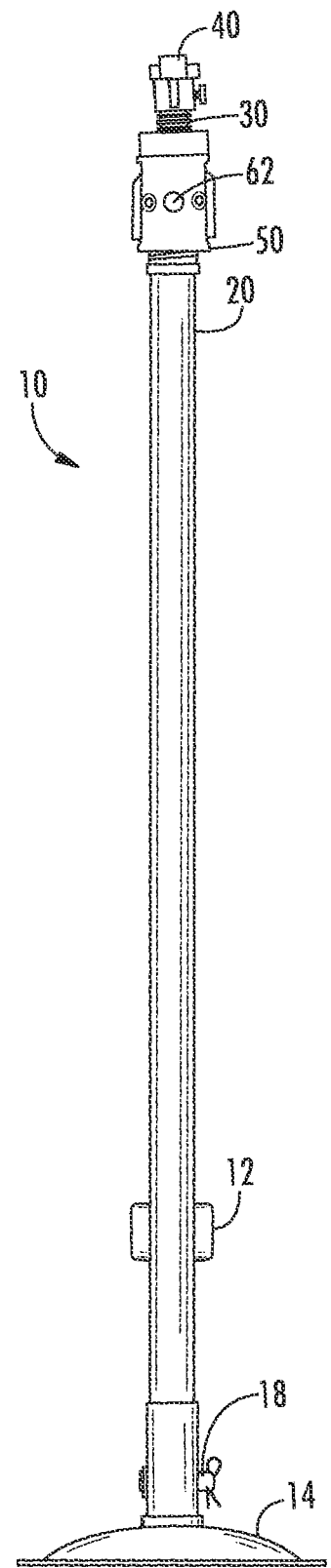
FIG. 5 is a side view of the under hoist stand seen in FIG. 4.

As seen in reference to FIGS. 4 and 5, an optional cushion member 15 can be provided, cushion 15 being of a material such as a compressible foam, silicone gasket, an accordion formed plastic, or other resilient material. Cushion member 15 that provides for a way of absorbing a load that may rest upon the handle assembly when the handle assembly is disengaged from the screw and the saddle and/or a supported work piece of the saddle may be lowered and come in contact with the cushion and the upper surface of the spin handle assembly.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it, should be understood that aspects of the various embodiments may be interchanged, both in whole, or in part. Therefore, the spirit and scope of the invention, should not be limited to the description of the preferred versions contained therein.

That which is claimed:

1. An under hoist support stand, comprising:
   a base;
   a support tube extending from the base, an upper edge of the support tube having a thrust bearing supported thereon;
   a screw partially housed within the support tube and having a free end in communication with a saddle; and
   a spin handle assembly in threaded communication with the screw, the spin handle assembly being used to raise and lower the screw relative to the support tube, the spin handle assembly further comprising a release mechanism for disengaging the spin handle assembly from threaded engagement with the screw, the release mechanism further comprising a first tab and a second tab spaced apart from each other and attached by respective spring pivots, each spring pivot positioned within an interior space defined by a housing connected to the screw, each first tab and second tab having a threaded inner surface above the respective spring pivot and a respective portion of each tab that is positioned below the respective spring pivot and is positioned along an exterior of the housing thereby allowing the screw to be manually raised and lowered through the spin handle assembly when disengaged by pivoting the first and second tabs and wherein between 50% to 70% of a portion of threaded surface of the threaded screw is engaged by the threaded inner surfaces of the first tab and second tab when the first and second tabs are released.

2. The under hoist support stand according to claim 1, wherein a pedal is connected to the base of the support tube, the pedal pivoting the support tube in an upward direction when depressed.

3. A process of adjusting a working height of an under hoist stand load bearing saddle, comprising:
   providing an under hoist stand comprising a screw member in communication with a saddle positioned on a terminal end of the screw member, the screw member positioned within an upper edge of a support tube and having a thrust bearing supported thereon;
   providing a spin handle assembly in threaded communication with the screw member, the spin handle assembly allowing movement of the screw member when threadily engaged by the spin handle assembly, the spin handle assembly further having a first tab and second tab that selectively disengages the spin handle assembly from threaded engagement with the screw member, the first tab and the second tab attached by respective spring pivots, each spring pivot positioned within an interior space defined by a housing connected to the screw member, each of the first and second tab having a threaded inner surface above the spring pivot and a portion of each of the first and second tab that is positioned below the spring pivot and is positioned along an exterior of the housing thereby allowing the screw to be manually raised or lowered when the first and second tabs are pivoted and disengaged from threaded engagement with the spin handle assembly;
   disengaging the screw member from the spin handle assembly by pivoting the first and second tabs;
   raising the screw member and the saddle to a support location beneath a vehicle;

reengaging the screw member with the spin handle assembly by releasing the first and second tabs; and rotating the spin handle assembly to further engage the saddle to a supported work piece.

4. The process according to claim 3, further comprising:

depressing a pedal in operative communication with the support tube;

lifting the support tube in a vertical direction in response depressing the pedal.

5. A process that allows for a lowering of a saddle of an under hoist support stand, comprising:

turning a spin handle in a counterclockwise direction to relieve saddle pressure off an under vehicle component;

disengaging a threaded portion of a screw from a mated threaded engagement within a spin handle assembly by pivoting a first and a second tab attached by a respective first and second spring pivot, each respective spring pivot positioned within an interior space defined by a housing connected to the screw, each of the first and second tabs having a threaded inner surface above the respective first and second spring pivots and a portion of each of the first and second tabs that is positioned below respective first and second spring pivots and is positioned along an exterior of the housing;

manually lowering the screw relative to a support base when the spin handle assembly is disengaged from the screw, the screw positioned within an upper edge of a support tube having a thrust bearing supported thereon; and reengaging the threaded portion of the screw by the spin handle assembly by releasing the first and second tabs.

6. The process according to claim 5, further comprising:

providing an elongated handle having opposing first and second ends;

depressing a pedal in operative communication with the support tube;

lifting the support tube in a vertical direction in response to depressing the pedal.

7. A spin handle assembly, comprising:

a housing defining an axial bore therethrough;

a pair of opposing openings defined within outer walls of the housing;

a first release tab attached by a first spring pivot within an interior space of one of the pair of opposing openings; and a second release tab attached by a second spring pivot within the interior space of one of the pair of opposing openings, said first release tab and said second release tab being in communication with the respective first spring pivot and second spring pivot which moves the respective first and second release tabs to a first position within the housing, said first and said second release tabs each defining a threaded surface adapted for engaging and securing with a threaded screw inserted in the axial bore, each of the first and second release tabs having a threaded inner surface above the respective first spring and second spring pivots and a portion of each of the first and second release tab that is positioned below the respective first and second spring pivots further positioned along an exterior of the housing;

wherein when the spin handle assembly has the threaded screw inserted within the axial bore, the respective threaded surfaces of the first release tab and the second release tab will engage the threaded screw via pressure supplied by the respective first spring pivot and second spring pivot, wherein between 50% to 70% of a portion of threaded surface of the threaded screw opposite the threaded inner surface is engaged by the threaded surfaces of the first and second release tabs, the first and second release tabs further allowing for a pivoted disengagement of the first and second threaded surfaces from the threaded screw, thereby allowing a free movement of the threaded screw relative to the spin handle assembly.

8. The spin handle assembly according to claim 7 wherein the spin handle assembly further defines at least one handle extending from an exterior surface of the housing.

* * * * *